United States Patent
Bordawekar et al.

(10) Patent No.: US 9,838,422 B2
(45) Date of Patent: Dec. 5, 2017

(54) DETECTING DENIAL-OF-SERVICE ATTACKS ON GRAPH DATABASES

(71) Applicant: International Business Machines Corporation, Armonk, NY (US)

(72) Inventors: Rajesh R. Bordawekar, Yorktown Heights, NY (US); Ashish Kundu, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 14/854,261

(22) Filed: Sep. 15, 2015

(65) Prior Publication Data

US 2017/0078324 A1    Mar. 16, 2017

(51) Int. Cl.
*H04L 29/06* (2006.01)
*G06F 21/55* (2013.01)

(52) U.S. Cl.
CPC ........ *H04L 63/1458* (2013.01); *G06F 21/554* (2013.01)

(58) Field of Classification Search
CPC .................................. H04L 63/00; G06F 8/00
See application file for complete search history.

(56) References Cited

U.S. PATENT DOCUMENTS

| | | | |
|---|---|---|---|
| 8,250,048 B2 | 8/2012 | Yalamanchi et al. | |
| 2008/0301135 A1 | 12/2008 | Alves et al. | |
| 2010/0138375 A1* | 6/2010 | Hanner | G06N 5/02 706/48 |
| 2010/0235879 A1* | 9/2010 | Burnside | H04L 63/0263 726/1 |
| 2012/0296924 A1 | 11/2012 | Iwama et al. | |

OTHER PUBLICATIONS

Kundu et al., "Query Routing Based on Complexity Class Determination," U.S. Appl. No. 14/220,172, filed Mar. 20, 2014, 35 pages.

* cited by examiner

*Primary Examiner* — Edward Zee
*Assistant Examiner* — Leynna Truvan
(74) *Attorney, Agent, or Firm* — Yee & Associates, P.C.; Jeffrey S. LaBaw (57) ABSTRACT

Detecting a denial-of-service attack on a graph database is provided. In response to receiving a request to process a graph query on the graph database from a client device via a network, a graph query pattern of the graph query is determined. In response to determining that the graph query pattern of the graph query matches a stored graph query pattern that lead to a previous denial-of-service attack on the graph database, the graph query is identified as the denial-of-service attack on the graph database. Then, the request to process the graph query is denied by dropping the graph query.

17 Claims, 5 Drawing Sheets

DETECTING DENIAL-OF-SERVICE ATTACKS ON GRAPH DATABASES

BACKGROUND

1. Field

The disclosure relates generally to protecting graph databases and more specifically to detecting denial-of-service attacks on graph databases using stored patterns of graph queries that identify whether a graph query is a denial-of-service attack.

2. Description of the Related Art

A graph database is a database that uses graph structures for semantic queries with nodes, edges, and properties to represent and store data. Nodes in the graph database represent entities, such as, for example, people, businesses, accounts, or any other item you might want to keep track of. Properties are pertinent information that relate to nodes. Edges represent the relationships that connect nodes to nodes or nodes to properties. The edges may be directed from one node to another or undirected with no specific from-to relationship between a pair of nodes.

A graph database may be brought down via one or more graph queries that are computationally intensive and intractable. Such a graph query may belong to an NP-complete, NP-hard, or other such computational complexity class (See, for example, Garey et al., *Computers and Intractability: A Guide to the Theory of NP-Completeness*, W.H. Freeman & Co., New York, N.Y. (1979)). Such an action to bring down a graph database using a graph query that is computationally intensive and intractable is referred to a denial-of-service (DoS) attack.

A denial-of-service attack is an attempt to make a machine or network resource unavailable or available with a very low level of service, such as an unacceptable amount of response time, by consuming its resources so that it can no longer provide its intended service. In this case, the denial-of-service attack is an effort to temporarily or indefinitely interrupt or suspend services provided by the graph database. A denial-of-service attack that is sent by two or more devices is referred to as a distributed denial-of-service attack (DDoS).

SUMMARY

According to one illustrative embodiment, a computer-implemented method for detecting a denial-of-service attack on a graph database is provided. In response to a computer receiving a request to process a graph query on the graph database from a client device via a network, the computer determines a graph query pattern of the graph query. In response to the computer determining that the graph query pattern of the graph query matches a stored graph query pattern that lead to a previous denial-of-service attack on the graph database, the computer identifies the graph query as the denial-of-service attack on the graph database. Then, the computer denies the request to process the graph query by dropping the graph query. According to other illustrative embodiments, a computer system and computer program product for detecting a denial-of-service attack on a graph database are provided.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
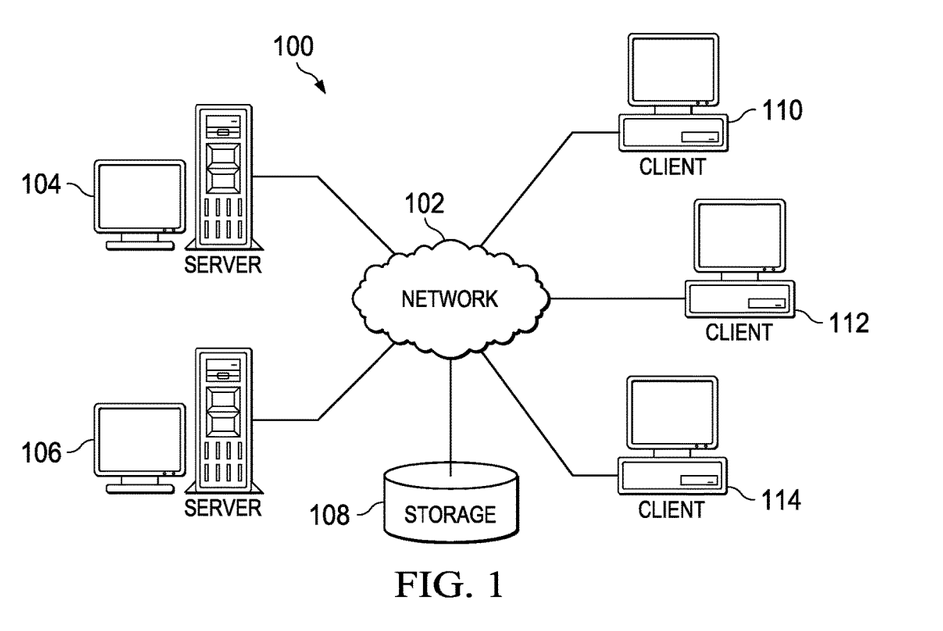
FIG. 1 is a pictorial representation of a network of data processing systems in which illustrative embodiments may be implemented.
Figure 2:
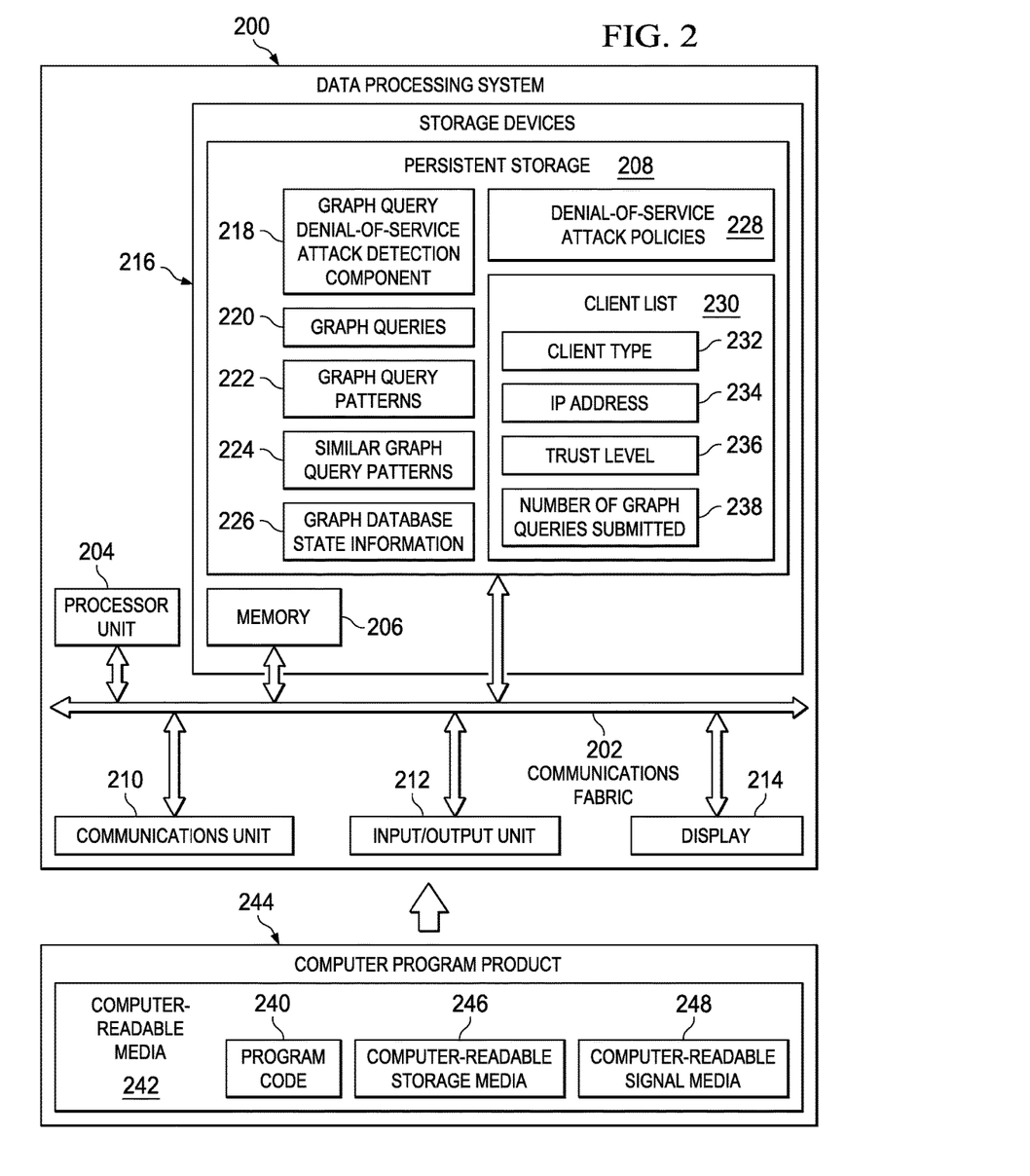
FIG. 2 is a diagram of a data processing system in which illustrative embodiments may be implemented.
Figure 3:
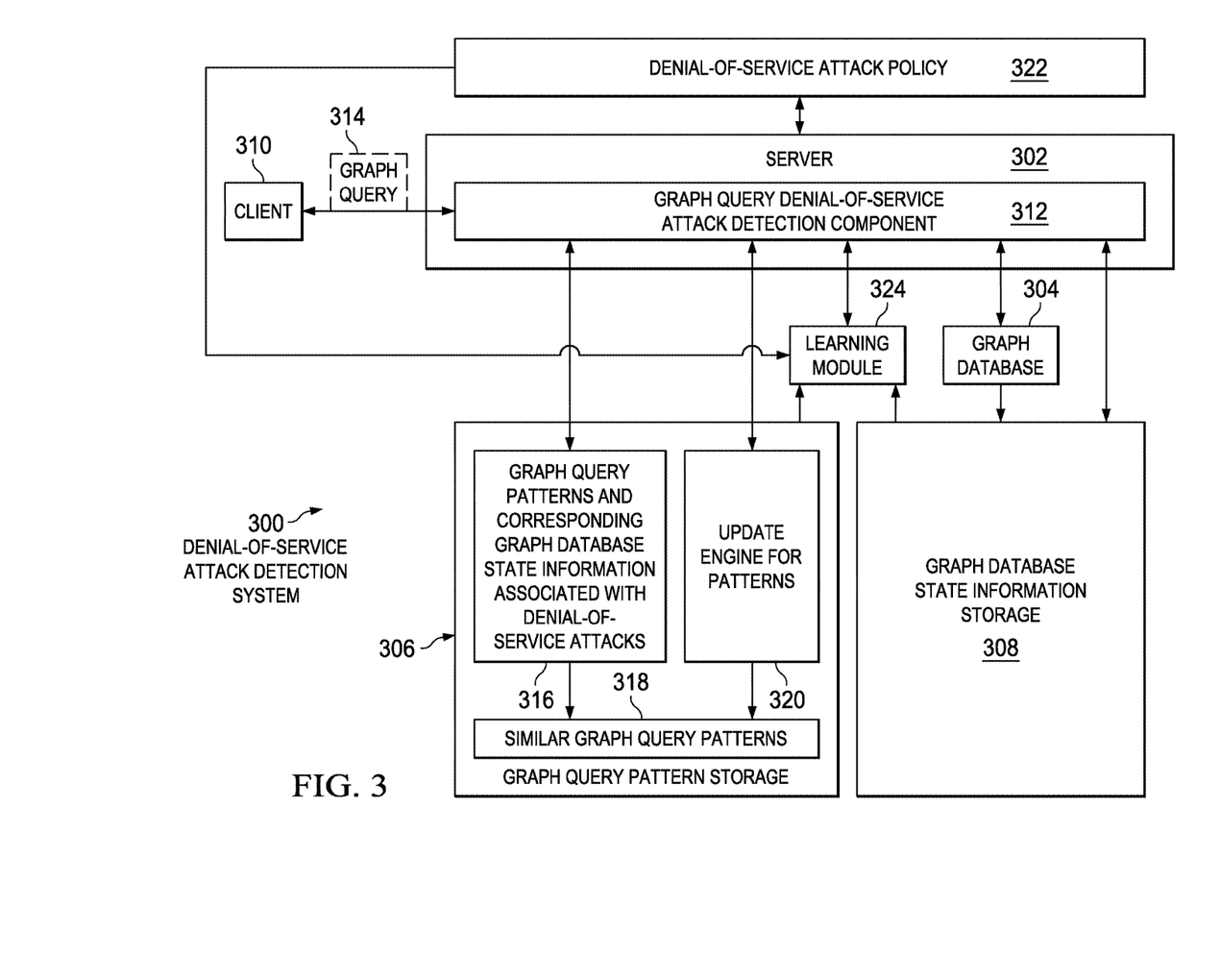
FIG. 3 is a diagram of an example of a denial-of-service attack detection system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services, such as, for example, protecting a set of one or more graph databases from denial-of-service attacks and distributed denial-of-service attacks on the graph databases, which may be owned by one or more enterprises, institutions, agencies, companies, and the like.

Client device 110, client device 112, and client device 114 also connect to network 102. Client devices 110, 112, and 114 are clients of server 104 and server 106. Server 104 and server 106 may provide information, such as boot files, operating system images, and software applications to client devices 110, 112, and 114.

In this example, client devices 110, 112, and 114 are computers, such as desktop computers or network computers with wire or wireless communication links to network 102. However, it should be noted that client devices 110, 112, and 114 are intended as examples only. In other words, client devices 110, 112, and 114 may include laptop computers, tablet computers, handheld computers, smart phones, personal digital assistants, and gaming systems, for example. Users of client devices 110, 112, and 114 may use client devices 110, 112, and 114 to submit graph queries to the set of graph databases protected by server 104 and server 106 from denial-of-service attacks.

Storage 108 is a network storage device capable of storing any type of data in an unstructured format. In this example, storage 108 represents a graph database. In addition, storage 108 may represent a set of one or more different types of graph databases, which store different types of data. Further, storage unit 108 may store other data, such as authentication or credential data that may include user names, passwords, and biometric data associated with system administrators. Furthermore, storage unit 108 may additionally store state information regarding each graph database in the set of graph databases, along with a set of graph query patterns that previously lead to a denial-of-service attack on each of the graph databases.

In addition, it should be noted that network data processing system 100 may include any number of additional server devices, client devices, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client device 110 over network 102 for use on client device 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores graph query denial-of-service attack detection component 218, graph queries 220, graph query patterns 222, similar graph query patterns 224, graph database state information 226, denial-of-service attack policies 228, and client list 230.

Graph query denial-of-service attack detection component 218 protects a set of one or more registered client graph databases from denial-of-service attacks by determining which submitted graph queries in graph queries 220, which are requesting data from the set of protected graph databases, present a threat of a denial-of-service attack on the set of protected graph databases.

Graph query denial-of-service attack detection component 218 utilizes graph query patterns 222 and similar graph query patterns 224 to identify whether a graph query in graph queries 220 is a denial-of-service attack. Upon receiving a graph query, graph query denial-of-service attack detection component 218 determines a pattern of the received graph query. Graph query denial-of-service attack detection component 218 may, for example, use a parser to parse the received graph query to determine the syntactic structure of the graph query and/or the semantic structure of the graph query. In addition, graph query denial-of-service attack detection component 218 may determine the type of the graph (e.g., type of data stored in the graph) and/or the structure of the graph (e.g., cyclic or acyclic graph structure) being queried as information to be included with the pattern of the received graph query. After determining the pattern of the received graph query, graph query denial-of-service attack detection component 218 determines whether the pattern of the received graph query matches a pattern in graph query patterns 222 or similar graph query patterns 224.

Graph query denial-of-service attack detection component 218 has previously identified graph query patterns 222 as leading to denial-of-service attacks on the set of protected graph databases. Thus, graph query patterns 222 are known malicious graph queries that lead to denial-of-service attacks. Similar graph query patterns 224 are patterns of graph queries that are similar in structure to graph query patterns 222 and may query graphs of similar type and structure. However, it should be noted that similar graph query patterns 224 may or may not always lead to denial-of-service attacks on the set of protected graph databases.

If graph query denial-of-service attack detection component 218 determines that the pattern of the received graph query matches one or more of the patterns in graph query patterns 222 or similar graph query patterns 224, then graph query denial-of-service attack detection component 218 identifies that pattern corresponding to the received graph query as a threat to the set of protected graph databases. As a result, graph query denial-of-service attack detection component 218 may record the pattern of the received graph query in graph query patterns 222. Alternatively, graph query denial-of-service attack detection component 218 may notify a system administrator to review the pattern of the received graph query to determine whether to record the pattern as a malicious pattern or to allow the request to process the graph query.

Graph query denial-of-service attack detection component 218 also records graph database state information 226 at the time a request to process a received graph query is denied and dropped. Graph query denial-of-service attack detection component 218 then associates graph database state information 226 with the pattern of the received graph query that was denied and dropped. Consequently, graph query denial-of-service attack detection component 218 also uses graph database state information 226 to determine whether submitted graph queries will cause a denial-of-service attack on the set of protected graph databases.

Denial-of-service attack policies 228 direct graph query denial-of-service attack detection component 218 as to which course of action to take in response to detecting a potential threat to one or more of the protected graph databases by a received graph query. Denial-of-service attack policies 228 may include, for example, whether to process or drop a received graph query, whether to notify a system administrator to review a received graph query prior to processing or dropping the graph query, or whether to process a received graph query in a safe mode (e.g., drop the received graph query in response to the received graph query consuming resources greater than a predefined threshold limit for resource consumption).

Graph query denial-of-service attack detection component 218 also may maintain client list 230. Client list 230 is a list of clients that submit graph queries to the protected set of graph databases. In this example, client list 230 includes client type 232, internet protocol (IP) address 234, trust level 236, and number of graph queries submitted 238. Client type 232 indicates the type of client, such as, for example, a business client, a personal client, an internal client, a business partner client, a government client, an unknown client, et cetera. Internet protocol address 234 lists the IP address of each of the clients in client list 230. Trust level 236 indicates a level of trust associated with each of the clients in client list 230. For example, if a particular client in client list 230 previously submitted a malicious graph query leading to a denial-of-service attack, trust level 236 for the particular client would be low to null. Number of graph queries submitted 238 tracks the number of graph queries submitted by each of the clients in client list 230. Number of graph queries submitted 238 may also track the number of graph queries submitted within a particular time frame, such as, for example, submitting 100 graph queries within 1 minute to the same graph database. Graph query denial-of-service attack detection component 218 also may use the information within client list 230 to determine whether submitted graph queries will cause a denial-of-service attack on a set of protected graph databases.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as a system administrator, and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a data processing system may be downloaded over a network from the data processing system to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that some graph queries submitted to graph databases may be intractable. Intractable means that a submitted graph query has a high level of complexity, which makes the graph query difficult to resolve. A graph query with high complexity is inherently difficult when the graph query requires significant resources (i.e., greater than a threshold level of resources) to process the graph query, such as, for example, process time required, storage space required, amount of network communication required, number of processors required, number or amount of the result of the graph query, or any combination thereof. Illustrative embodiments may utilize multiple levels of intractability, such as, for example, highly intractable, moderately intractable, and slightly intractable, depending on the amount of resources required to process a graph query.

A malicious client device may, for example, intentionally submit a graph query that is intractable, consuming time and resources such that a graph database comes under a denial-of-service attack. As a result of the denial-of-service attack caused by the intractable graph query, the graph database can no longer process other graph queries. Sometimes a client device may submit a graph query that is not intended to be malicious, but when processed, causes a current state of the graph database to make the graph query intractable. Consequently, the submitted graph query causes an unintentional denial-of-service attack on the graph database.

Here are some examples of graph queries that may be malicious. For example, a graph query requests to receive all cycles in a graph of the graph database where the number of nodes in a cycle is greater than 10. Illustrative embodiments identify the graph query as intractable, when the graph is a cyclic graph that includes a number of nodes greater than 1000. Illustrative embodiments identify the graph query as tractable, when the graph is an acyclic or logical graph that includes a number of nodes less than or equal to 1000. Tractable means that the graph query can be solved in polynomial time using limited resources (i.e., using resources less than the threshold level of resource usage).

In addition, illustrative embodiments may identify graph queries that are similar to the example above. For example, a graph query may request to receive all cycles in a graph where the number of nodes in a cycle is greater than 8, 9, 11, or 12. Another example of a similar graph query may be that the graph query requests to receive all subgraphs of the graph where each subgraph includes k number of nodes (e.g., where k is greater than 9) and k−1 number of edges and the subgraph is strongly connected.

Here are some examples of graph queries that illustrative embodiments will always identify as intractable. For example, a graph query that terminates, but the graph query is included in an NP-hard computational complexity class or similar complexity class. In this example, the graph query requests to select a path in a graph where all the nodes are included in the path and a total weight of the edges connecting the nodes in the path is a minimum value among all such paths in the graph with the weights of the edges being greater than 0. As another example, the graph query does not terminate for a graph where there is at least one cycle in the graph with all edges having a weight greater than 0. In this example, the graph query requests to select the number of times a cycle is traversed where a cycle is traversed in the beginning and the cycle is traversed again when the sum of weights of the edges traversed is greater than 0.

Illustrative embodiments provide a computer-implemented method, computer system, and computer program product for protecting graph databases by determining whether a graph query may lead to a denial-of-service attack on a graph database using a set of stored graph query patterns that previously lead to denial-of-service attacks. In other words, illustrative embodiments utilize graph query pattern matching to identify malicious intractable graph queries. Matching a pattern of a currently received graph query to a known graph query pattern that has been previously identified as leading to a denial-of-service attack identifies that pattern of the currently received graph query as a malicious intractable graph query.

Optionally, illustrative embodiments may match a stored graph query pattern with an incoming graph query when a current state of a graph database is similar to a state of the graph database that the stored graph query pattern is associated with. A pattern of a graph query may correspond to a structure and/or type of the graph being queried, a syntactic structure of the graph query, and a semantic structure of the query. For example, a pattern may be "for all cycles, return all the cycles of a length greater than 1". If a graph query or a portion of the graph query matches a stored graph query pattern or is similar to a stored graph query pattern, then illustrative embodiments may drop the graph query or may postpone processing the graph query until after a system administrator reviews the graph query for malicious properties.

Illustrative embodiments may utilize a set of denial-of-service policies to determine what to do with a submitted graph query, such as, for example, drop the graph query, process the graph query later after system administrator review, or process the graph query in a safe mode. For example, if resource consumption by the graph query is greater than a threshold level, then illustrative embodiments will deny a request to process the graph query by dropping the graph query. Illustrative embodiments then log such events in a system log and include details of each event. If such a submitted graph query has a pattern that is similar to a stored graph query pattern, but is not a 100% match with the stored graph query pattern, then illustrative embodiments add that graph query to a list of similar graph query patterns.

Illustrative embodiments determine whether similarities exist between semantics of graph query patterns. Similarity in semantics may include, for example, a similarity of potential results the query is querying for, whether a query has similar conditions and loops, or similarity in the size of the results. An example of similar patterns is: "for all cycles, output cycle of a length greater than 10", which is similar to "for each cycle of a length greater than 9.5, output cycle". Illustrative embodiments may match a structure or pattern of a graph query or part of the graph query using abstract syntax trees of the graph queries.

In addition, illustrative embodiments dynamically update the set of graph query patterns in a graph query pattern database as new malicious graph query patterns are identified. As a result, illustrative embodiments are able to determine which graph queries on graph databases will not carry out a denial-of-service attack.

With reference now to FIG. 3, a diagram of an example of a denial-of-service attack detection system is shown in accordance with an illustrative embodiment. Denial-of-service attack detection system 300 may be implemented in a network of distributed data processing systems, such as network data processing system 100 in FIG. 1. In this example, denial-of-service attack detection system 300 includes server 302, graph database 304, graph query pattern storage 306, graph database state information storage 308, and client 310. However, it should be noted that denial-of-service attack detection system 300 may include more or fewer components than illustrated. In addition, denial-of-service attack detection system 300 may combine components. For example, an alternative illustrative embodiment may include graph database 304, graph query pattern storage 306, graph database state information storage 308, or any combination thereof, in server 302. Further, graph database 304 may represent a plurality of graph databases.

Server 302 includes graph query denial-of-service attack detection component 312. Graph query denial-of-service attack detection component 312 may be, for example, graph query denial-of-service attack detection component 218 in FIG. 2. Server 302 utilizes graph query denial-of-service attack detection component 312 to detect whether graph query 314, which is submitted by client 310 via a network, will result in a denial-of-service attack on graph database 304.

Graph query pattern storage 306 stores graph query patterns and corresponding graph database state information associated with denial-of-service attacks 316, similar graph query patterns 318, and update engine for patterns 320. Graph query patterns and corresponding graph database state information associated with denial-of-service attacks 316 and similar graph query patterns 318 may be, for example, graph query patterns 222, graph database state information 226, and similar graph query patterns 224 in FIG. 2. The graph query patterns in graph query patterns and corresponding graph database state information associated with denial-of-service attacks 316 have been previously identified as causing denial-of-service attacks on graph database 304.

Server 304 associates each of the graph query patterns with one or more states of graph database 304 when a denial-of-service attack was previously carried out by a respective graph query corresponding to a particular pattern. An example state of graph database 304 may be the number of graphs included in graph database 304. Other example states may be that graphs in graph database 304 include cycles or that graphs in graph database 304 do not include any cycles.

Graph database state information storage 308 stores the dynamic state of graph database 304, along with history information regarding what was the previous state of graph database 304, what graph queries were processed that led to this particular state from the previous state, identification of which client or clients submitted the graph queries, amount of time taken for processing the graph queries, and other associated information. Similar graph query patterns 318 store patterns of graph queries that are similar in terms of structure and/or semantics with graph query patterns 316. Similar graph query patterns 318 may or may not lead to denial-of-service attacks on graph database 304.

Update engine for patterns 320 updates graph query pattern storage 306 with graph query patterns that graph query denial-of-service attack detection component 312 identifies as new malicious intractable patterns associated with submitted graph queries. In addition, update engine for patterns 320 allows a system administrator or another denial-of-service attack detection system to add, remove, or update graph query patterns in graph query pattern storage 318.

Denial-of-service attack policy 322 may be, for example, one of denial-of-service attack policies 228 in FIG. 2. Denial-of-service attack policy 322 may, for example, specify whether to switch on or switch off denial-of-service attack detection or how frequently denial-of-service attack detection should be applied to the graph queries. The frequency criteria or rules may be based on the type of clients, the IP addresses, the degree of trust of the clients, the numbers of requests sent or received by the clients, and the size of results.

Graph query denial-of-service attack detection component 312 utilizes learning module 324 to protect graph database 304 from graph query denial-of-service attacks. Learning module 324 utilizes information regarding client 310, graph query 314, query patterns 316 and 318, and graph database 304. Graph query denial-of-service attack detection component 312 utilizes learning module 324 to determine if graph query 314 contains a malicious pattern that may lead to a denial-of-service attack on graph database 304. Given an incoming graph query, such as graph query 314, learning module 324 calculates a probability value between 0 and 1 indicating the likelihood that the given graph query will lead to a denial-of-service attack on graph database 304. For example, the greater the probability value associated with the given incoming graph query, the greater the likelihood that the given graph query will lead to a denial-of-service attack on graph database 304. Learning module 324 takes several factors into account when calculating the probability value associated with a given graph query. Some of the factors taken into account are: meta-data associated with each graph query pattern that is known to lead to denial-of-service attacks, meta-data associated with each similar graph query pattern that may lead to a denial-of-service attack, meta-data associated with clients, such as user identifications, credentials, internet protocol addresses, and historical data, and state of the graph database, and whether the graph database has been subjected to any specific denial-of-service attacks using graph queries. Learning module 324 may utilize, for example, Bayesian learning models to calculate such probability values based on these factors. With each graph query pattern that is included in the list of graph query patterns or similar graph query patterns leading to denial-of-service, learning module 324 associates a set of meta-data information with each respective graph query pattern, such as count (i.e., number of times a graph query pattern was received), last time the graph query pattern was received, and from which client the graph query pattern was received. Each time learning module 324 identifies a specific graph pattern to be a match or a similar match, learning module 324 increases the count by 1 and updates the corresponding meta-data information details. Learning module 324 may utilize the meta-data information, such as the count, as part of denial-of-service attack policy 322 to determine the type of action to take against such a graph query pattern. For example, if a graph query is received that has a graph query pattern with a count greater than 10, then learning module 324 drops the received graph query immediately and reports such an incident to the system administrator or if a graph query has a graph query pattern with a count greater than 5, but less than 10, then learning module 324 drops the graph query. If the policy for denial-of-service attack prevention mentioned elsewhere in this specification specifies that graph queries with probability values >=x, 0<=x<1, then learning module 324 regards that graph query as a denial-of-service query because that graph query may lead to a denial-of-service attack.

Figure 4A:
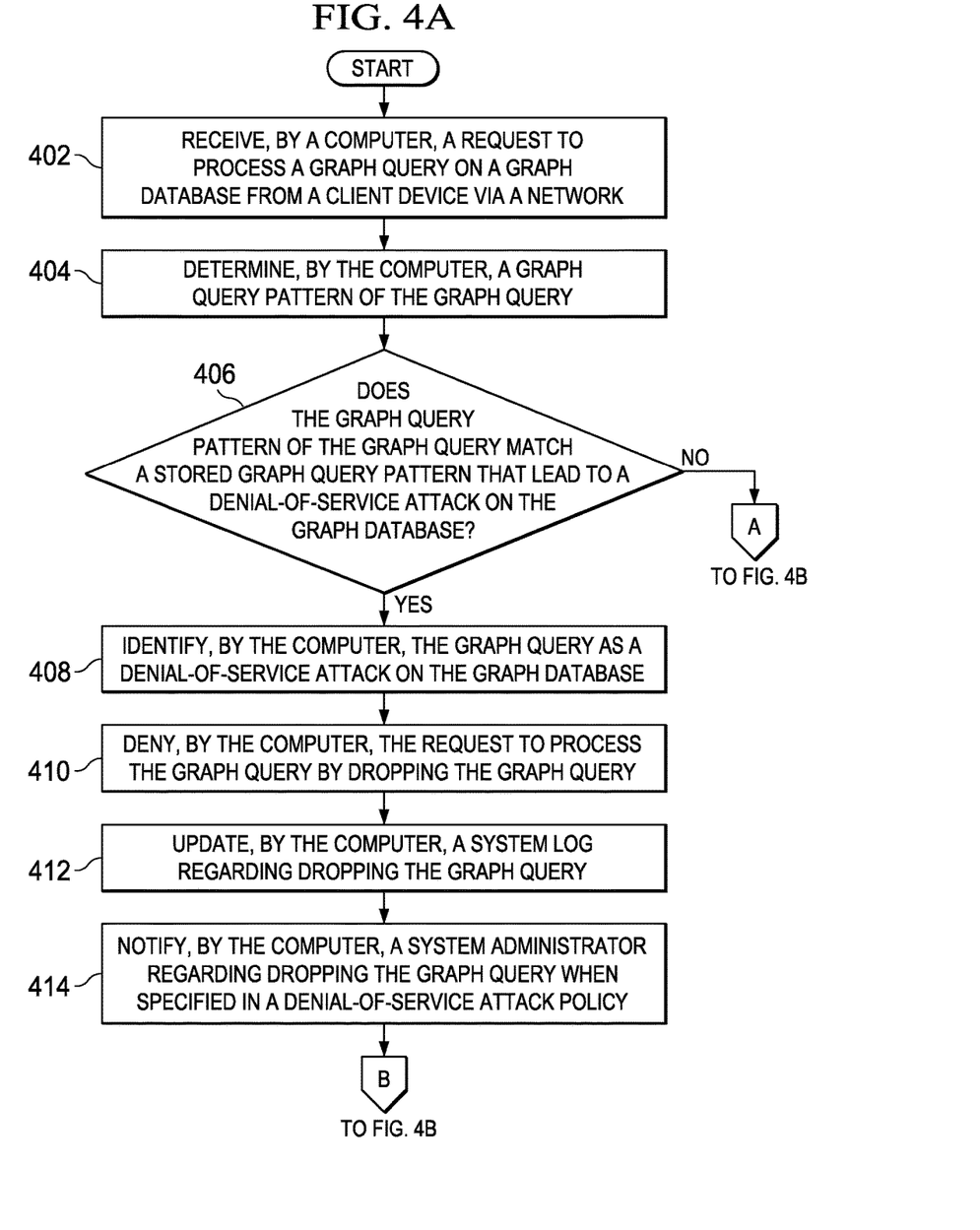
FIGS. 4A-4B are a flowchart illustrating a process for detecting a denial-of-service attack on a graph database in accordance with an illustrative embodiment.
Figure 4B:
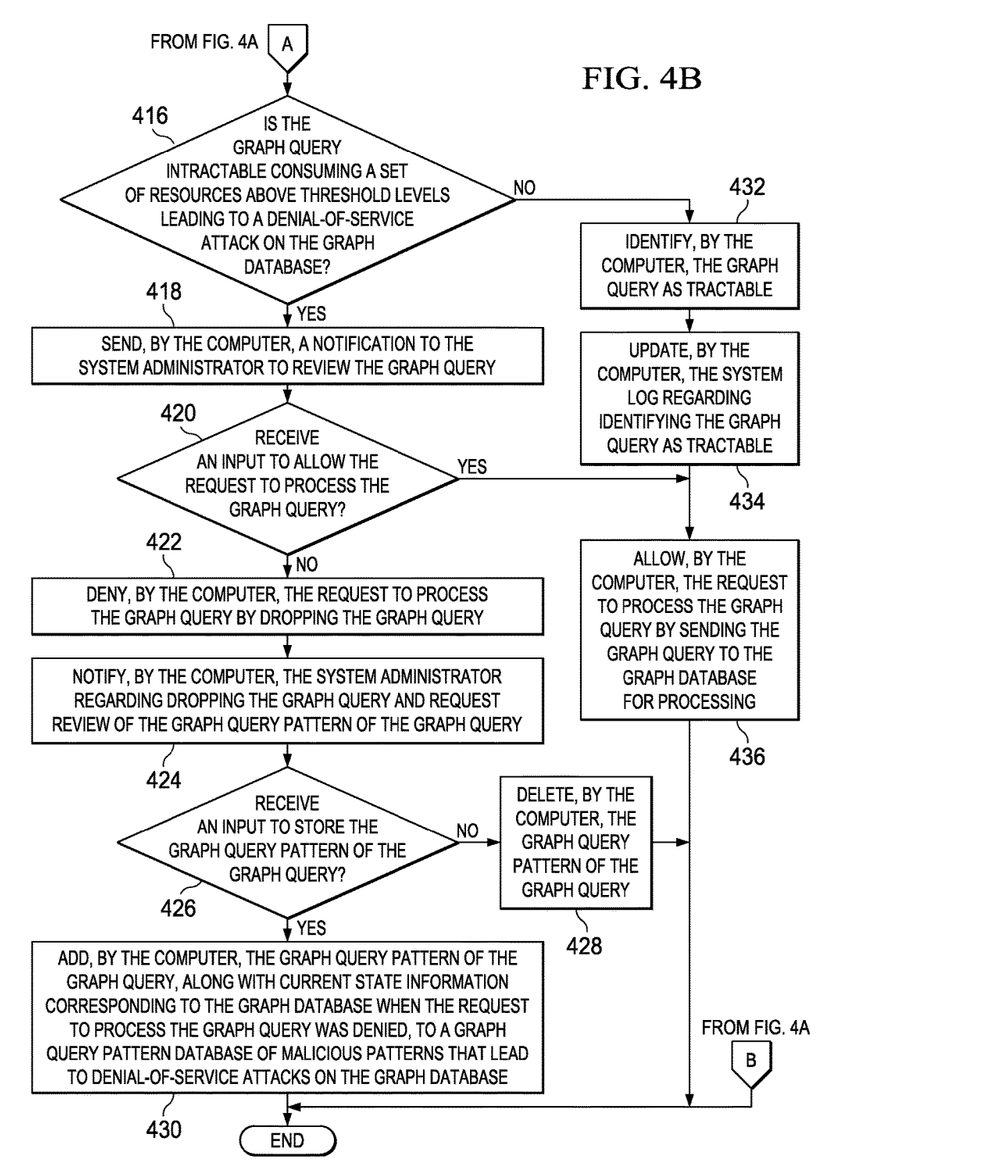

With reference now to FIGS. 4A-4B, a flowchart illustrating a process for detecting a denial-of-service attack on a graph database is shown in accordance with an illustrative embodiment. The process shown in FIGS. 4A-4B may be implemented in a computer, such as, for example, server 104 in FIG. 1, data processing system 200 in FIG. 2, and server 302 in FIG. 3.

The process begins when the computer receives a request to process a graph query on a graph database from a client device via a network (step 402). The graph query may be, for example, graph query 314 in FIG. 3. The graph database may be, for example, graph database 304 in FIG. 3. The client device may be, for example, client 310 in FIG. 3. The network may be, for example, network 102 in FIG. 1.

In response to receiving the request to process the graph query in step 402, the computer determines a graph query pattern of the graph query (step 404). The computer may determine the graph query pattern of the graph query by, for example, parsing the graph query. Afterward, the computer makes a determination as to whether the graph query pattern of the graph query matches a stored graph query pattern that previously lead to a denial-of-service attack on a graph database (step 406). The stored graph query pattern may be, for example, one of the graph query patterns in graph query patterns 222 or similar graph query patterns 224 in FIG. 2.

If the computer determines that the graph query pattern of the graph query does match a stored graph query pattern that previously lead to a denial-of-service attack on the graph database, yes output of step 406, then the computer identifies the graph query as a denial-of-service attack on the graph database (step 408). In addition, the computer denies the request to process the graph query by dropping the graph query (step 410). Further, the computer updates a system log regarding dropping the graph query (step 412). Optionally, the computer notifies a system administrator regarding dropping the graph query when specified in a denial-of-service attack policy (step 414). Thereafter, the process terminates.

Returning again to step 406, if the computer determines that the graph query pattern of the graph query does not match a stored graph query pattern, no output of step 406, then the computer makes a determination as to whether the graph query is intractable (step 416). The computer may determine that the graph query is intractable in response to determining that the graph query will consume a set of resources above threshold levels leading to a denial-of-service attack on the graph database. The set of resources may be, for example, processing time, storage space, network communication usage, size of graph query result, number of processors used, or any combination thereof.

If the computer determines that the graph query is intractable, yes output of step 416, then the computer sends a notification to the system administrator to review the graph query (step 418). In addition, the computer makes a determination as to whether the computer received an input to allow the request to process the graph query (step 420). The system administrator may enter the input into the computer via, for example, a display with touch screen capabilities, such as display 214 or an input device, such as a keyboard or a mouse of input/output unit 212 of FIG. 2.

If the computer determines that the computer did receive an input to allow the request to process the graph query, yes output of step 420, then the process proceeds to step 430. If the computer determines that the computer did not receive an input to allow the request to process the graph query, no output of step 420, then the computer denies the request to process the graph query by dropping the graph query (step 422). Further, the computer notifies the system administrator regarding dropping the graph query and requests review of the graph query pattern of the graph query (step 424). Afterward, the computer makes a determination as to whether the computer received an input to store the graph query pattern of the graph query (step 426). If the computer determines that an input to store the graph query pattern of the graph query was not received, no output of step 426, then the computer deletes the graph query pattern of the graph query (step 428) and the process terminates thereafter. If the computer determines that an input to store the graph query pattern of the graph query was received, yes output of step 426, then the computer adds the graph query pattern of the graph query, along with current state information corresponding to the graph database when the request to process the graph query was denied, to a graph query pattern database of malicious patterns that lead to denial-of-service attacks on the graph database (step 430). The state information corresponding to the graph database may be, for example, graph database state information 226 in FIG. 2. The graph query pattern database of malicious patterns may be, for example, graph query pattern storage 306 in FIG. 3. Thereafter, the process terminates.

Returning again to step 416, if the computer determines that the graph query is not intractable, no output of step 416, then the computer identifies the graph query as tractable (step 432). In addition, the computer updates the system log regarding identifying the graph query as tractable (step 434). The computer also allows the request to process the graph query by sending the graph query to the graph database for processing (step 436). Thereafter, the process terminates.

Thus, illustrative embodiments provide a computer-implemented method, computer system, and computer program product for protecting graph databases by identifying whether a submitted graph query is a denial-of-service attack on a particular graph database. As a result, illustrative embodiments improve the functioning of the graph databases by preventing denial-of-service attacks. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for detecting a denial-of-service attack on a graph database, the computer-implemented method comprising:
    responsive to a computer receiving a request to process a graph query on the graph database from a client device via a network, determining, by the computer, a graph query pattern of the graph query;
    responsive to the computer determining that the graph query pattern of the graph query matches a stored graph query pattern that led to a previous denial-of-service attack on the graph database, identifying, by the computer, the graph query as the denial-of-service attack on the graph database;
    associating, by the computer, the graph query pattern with a current state of the graph database when the denial-of-service attack was carried out by the graph query corresponding to the graph query pattern;
    updating, by the computer, a set of meta-data information associated with the stored graph query pattern that includes a count of a number of times the graph query pattern was received, a last time the graph query pattern was received, information corresponding to the current state of the graph database, history information associated with a previous state of the graph database, the graph query associated with the request that led to the current state of the graph database from the previous state, identification of the client device that sent the request to process the graph query, and an amount of time taken to process the graph query; and
    denying, by the computer, the request to process the graph query by dropping the graph query.

2. The computer-implemented method of claim 1, further comprising:
    responsive to the computer determining that the graph query pattern of the graph query does not match the stored graph query pattern that led to the previous denial-of-service attack on the graph database, calculating, by the computer, a probability value indicating a likelihood that the graph query leads to the denial-of-service attack on the graph database; and
    responsive to the computer determining that the probability value calculated exceeds a predetermined threshold, denying, by the computer, the request to process the graph query by dropping the graph query, wherein the computer determines the graph query pattern of the graph query by parsing the graph query to determine at least one of a syntactic structure of the graph query and a semantic structure of the graph query, to determine a type of graph database according to data stored in the graph database, and to determine whether a structure of the graph database is one of cyclic and acyclic, as information to include with a pattern of the graph query received.

3. The computer-implemented method of claim 2, further comprising:
    calculating, by the computer, the probability value using meta-data associated with graph query patterns that are known to lead to denial-of-service attacks, meta-data associated with similar graph query patterns that are known to lead to denial-of-service attacks, meta-data associated with clients and state of the graph database, and meta-data indicating whether the graph database has been subjected to any specific denial-of-service attacks using graph queries.

4. The computer-implemented method of claim 1, further comprising:
    responsive to the computer determining that the graph query pattern of the graph query does not match the stored graph query pattern that led to the previous denial-of-service attack on the graph database, determining, by the computer, whether the graph query is intractable;
    responsive to the computer determining that the graph query is intractable, sending, by the computer, a notification to a system administrator to review the graph query;
    responsive to the computer determining that the computer did not receive an input to allow the request to process the graph query, denying, by the computer, the request to process the graph query by dropping the graph query; and
    updating, by the computer, a system log regarding the dropping of the graph query including details of an event.

5. The computer-implemented method of claim 4, wherein the computer determines that the graph query is intractable in response to processing of the graph query requiring consumption of resources greater than a predetermined threshold level of resource consumption.

6. The computer-implemented method of claim 4, further comprising:
    responsive to the computer not receiving the input to allow the request to process the graph query and the computer denying the request to process the graph query by dropping the graph query, adding, by the computer, the graph query pattern of the graph query, along with current state information corresponding to the graph database when the request to process the graph query was denied, to a graph query pattern database of malicious patterns that led to denial-of-service attacks on the graph database.

7. The computer-implemented method of claim 4, further comprising:
    responsive to the computer determining that the graph query is not intractable, identifying, by the computer, the graph query as tractable;
    updating, by the computer, the system log regarding identifying the graph query as tractable; and
    allowing, by the computer, the request to process the graph query by sending the graph query to the graph database for processing.

8. A computer system for detecting a denial-of-service attack on a graph database, the computer system comprising:
    a bus system;
    a storage device connected to the bus system, wherein the storage device stores program instructions; and
    a processor connected to the bus system, wherein the processor executes the program instructions to:

determine a graph query pattern of a graph query in response to receiving a request to process the graph query on the graph database from a client device via a network;

identify the graph query as the denial-of-service attack on the graph database in response to determining that the graph query pattern of the graph query matches a stored graph query pattern that led to a previous denial-of-service attack on the graph database;

associate the graph query pattern with a current state of the graph database when the denial-of-service attack was carried out by the graph query corresponding to the graph query pattern;

update a set of meta-data information associated with the stored graph query pattern that includes a count of a number of times the graph query pattern was received, a last time the graph query pattern was received, information corresponding to the current state of the graph database, history information associated with a previous state of the graph database, the graph query associated with the request that led to the current state of the graph database from the previous state, identification of the client device that sent the request to process the graph query, and an amount of time taken to process the graph query; and deny the request to process the graph query by dropping the graph query.

9. The computer system of claim 8, wherein the processor further executes the program instructions to:

calculate a probability value indicating a likelihood that the graph query leads to the denial-of-service attack on the graph database in response to determining that the graph query pattern of the graph query does not match the stored graph query pattern that led to the previous denial-of-service attack on the graph database; and deny the request to process the graph query by dropping the graph query in response to determining that the probability value calculated exceeds a predetermined threshold, wherein the computer system determines the graph query pattern of the graph query by parsing the graph query to determine at least one of a syntactic structure of the graph query and a semantic structure of the graph query, to determine a type of graph database according to data stored in the graph database, and to determine whether a structure of the graph database is one of cyclic and acyclic, as information to include with a pattern of the graph query received.

10. The computer system of claim 8, wherein the processor further executes the program instructions to:

determine whether the graph query is intractable in response to determining that the graph query pattern of the graph query does not match the stored graph query pattern that led to the previous denial-of-service attack on the graph database;

send a notification to a system administrator to review the graph query in response to determining that the graph query is intractable;

deny the request to process the graph query by dropping the graph query in response to determining that an input to allow the request to process the graph query was not received; and update a system log regarding the dropping of the graph query including details of an event.

11. The computer system of claim 10, wherein the computer system determines that the graph query is intractable in response to processing of the graph query requiring consumption of resources greater than a predetermined threshold level of resource consumption.

12. A computer program product for detecting a denial-of-service attack on a graph database, the computer program product comprising a computer readable storage medium having program instructions embodied therewith, the program instructions executable by a computer, to cause the computer to perform a method comprising:

responsive to the computer receiving a request to process a graph query on the graph database from a client device via a network, determining, by the computer, a graph query pattern of the graph query;

responsive to the computer determining that the graph query pattern of the graph query matches a stored graph query pattern that led to a previous denial-of-service attack on the graph database, identifying, by the computer, the graph query as the denial-of-service attack on the graph database;

associating, by the computer, the graph query pattern with a current state of the graph database when the denial-of-service attack was carried out by the graph query corresponding to the graph query pattern;

updating, by the computer, a set of meta-data information associated with the stored graph query pattern that includes a count of a number of times the graph query pattern was received, a last time the graph query pattern was received, information corresponding to the current state of the graph database, history information associated with a previous state of the graph database, the graph query associated with the request that led to the current state of the graph database from the previous state, identification of the client device that sent the request to process the graph query, and an amount of time taken to process the graph query; and denying, by the computer, the request to process the graph query by dropping the graph query.

13. The computer program product of claim 12, further comprising program instructions, executable by the computer, to cause the computer to perform the method further comprising:

responsive to the computer determining that the graph query pattern of the graph query does not match the stored graph query pattern that led to the previous denial-of-service attack on the graph database, calculating, by the computer, a probability value indicating a likelihood that the graph query leads to the denial-of-service attack on the graph database; and responsive to the computer determining that the probability value calculated exceeds a predetermined threshold, denying, by the computer, the request to process the graph query by dropping the graph query, wherein the computer determines the graph query pattern of the graph query by parsing the graph query to determine at least one of a syntactic structure of the graph query and a semantic structure of the graph query, to determine a type of graph database according to data stored in the graph database, and to determine whether a structure of the graph database is one of cyclic and acyclic, as information to include with a pattern of the graph query received.

14. The computer program product of claim 12, further comprising program instructions, executable by the computer, to cause the computer to perform the method further comprising:

responsive to the computer determining that the graph query pattern of the graph query does not match the stored graph query pattern that led to the previous denial-of-service attack on the graph database, determining, by the computer, whether the graph query is intractable;

responsive to the computer determining that the graph query is intractable, sending, by the computer, a notification to a system administrator to review the graph query;

responsive to the computer determining that the computer did not receive an input to allow the request to process the graph query, denying, by the computer, the request to process the graph query by dropping the graph query; and updating, by the computer, a system log regarding the dropping of the graph query including details of an event.

15. The computer program product of claim 14, wherein the computer determines that the graph query is intractable in response to processing of the graph query requiring consumption of resources greater than a predetermined threshold level of resource consumption.

16. The computer program product of claim 14, further comprising:

responsive to the computer not receiving the input to allow the request to process the graph query, denying, by the computer, the request to process the graph query by dropping the graph query; and adding, by the computer, the graph query pattern of the graph query, along with current state information corresponding to the graph database when the request to process the graph query was denied, to a graph query pattern database of malicious patterns that led to denial-of-service attacks on the graph database.

17. The computer program product of claim 14, further comprising:

responsive to the computer determining that the graph query is not intractable, identifying, by the computer, the graph query as tractable;

updating, by the computer, the system log regarding identifying the graph query as tractable; and allowing, by the computer, the request to process the graph query by sending the graph query to the graph database for processing.

\* \* \* \* \*